United States Patent
Pacheco-Ruiz et al.

(10) Patent No.: US 11,267,736 B2
(45) Date of Patent: Mar. 8, 2022

(54) SIMULTANEOUS PHASE OPERATED ANAEROBIC SEQUENTIAL BATCH REACTOR

(71) Applicant: Veolia Water Solutions & Technologies Support, Saint Maurice (FR)

(72) Inventors: Santiago Pacheco-Ruiz, Delft (NL); Jeronimus Gerardus Maria Van Der Lubbe, Delft (NL); Thierry Alphonse Arnaud, Delft (NL)

(73) Assignee: Veolia Water Solutions & Technologies Support, Saint Maurice (FR)

( * ) Notice: Subject to any disclaimer, the term of this patent is extended or adjusted under 35 U.S.C. 154(b) by 0 days.

(21) Appl. No.: 16/772,106

(22) PCT Filed: Sep. 20, 2018

(86) PCT No.: PCT/EP2018/075453
§ 371 (c)(1),
(2) Date: Jun. 11, 2020

(87) PCT Pub. No.: WO2019/115034
PCT Pub. Date: Jun. 20, 2019

(65) Prior Publication Data
US 2021/0087087 A1 Mar. 25, 2021

(30) Foreign Application Priority Data
Dec. 11, 2017 (EP) .................................. 17206421

(51) Int. Cl.
*C02F 3/28* (2006.01)
*B01D 21/00* (2006.01)
(Continued)

(52) U.S. Cl.
CPC .......... *C02F 3/282* (2013.01); *B01D 21/0048* (2013.01); *C02F 3/006* (2013.01);
(Continued)

(58) Field of Classification Search
CPC .......... C02F 3/282; C02F 3/006; C02F 3/286; C02F 3/2866; C02F 11/04;
(Continued)

(56) References Cited

U.S. PATENT DOCUMENTS 4,780,415 A * 10/1988 Ducellier ............... C12M 27/20
435/166
2005/0242023 A1* 11/2005 Degarie ................. A01C 3/028
210/603
(Continued)

FOREIGN PATENT DOCUMENTS

EP 1 806 324 7/2007
EP 1806324 A1 * 7/2007
(Continued)

OTHER PUBLICATIONS

"Principles and potential of the anaerobic digestion of waste-activated sludge", Progress in Energy and Combustion Science, Elsevier Science Publishers, Amsterdam, NL, vol. 34, No. 6, pp. 755-781, Aug. 8, 2008, XP025478976, ISSN: 0360-1285, DOI: 10.1016/J.PECS.2008.06.002.*

(Continued)

*Primary Examiner* — Fred Prince
(74) *Attorney, Agent, or Firm* — Morrison & Foerster LLP

(57) ABSTRACT

Process for treating an aqueous fluid whereby a biogas is produced in an installation comprising a bioreactor and a separate container, the process comprising (i) a bioreactor feeding stage; (ii) a batch reaction stage, wherein biogas is formed and formed biogas is temporarily stored in the
(Continued)

separate container, and at least one further stage (iii) comprising a settling stage and/or an aqueous fluid effluent discharge stage, wherein the biogas stored in the separate container is used to reduce fluctuations in a biogas exit flow from the installation. An installation for carrying out the process and the use thereof.

21 Claims, 9 Drawing Sheets

(51) Int. Cl.
    *C02F 3/00*     (2006.01)
    *C02F 11/04*     (2006.01)
    *C02F 103/32*     (2006.01)

(52) U.S. Cl.
    CPC ............ *C02F 3/286* (2013.01); *C02F 3/2866* (2013.01); *C02F 11/04* (2013.01); *C02F 2103/327* (2013.01); *C02F 2203/002* (2013.01); *C02F 2209/38* (2013.01)

(58) Field of Classification Search
    CPC .......... C02F 2103/327; C02F 2203/002; C02F 2209/38; C02F 3/2893; B01D 21/0048; Y02E 50/30

USPC ....................................................... 210/603
See application file for complete search history.

(56) References Cited

U.S. PATENT DOCUMENTS

| 2009/0176289 | A1* | 7/2009 | Friedmann | ............. | C12M 47/18 |
| | | | | | 435/167 |
| 2014/0197096 | A1* | 7/2014 | Strano | ....................... | C02F 9/00 |
| | | | | | 210/602 |
| 2014/0370566 | A1* | 12/2014 | Hughes | .................. | C12M 47/10 |
| | | | | | 435/168 |

FOREIGN PATENT DOCUMENTS

EP          2 558 421          1/2017
EP          2558421 B1 *    1/2017

OTHER PUBLICATIONS

Appels et al., "Principles and potential of the anaerobic digestion of waste-activated sludge," Progress in Energy and Combustion Science 34 (2008) 755-781.

International Search Report for PCT/EP2018/075453, dated Oct. 25, 2018, 5 pages.

* cited by examiner

SIMULTANEOUS PHASE OPERATED ANAEROBIC SEQUENTIAL BATCH REACTOR

CROSS-REFERENCE TO RELATED APPLICATIONS

This application is the national phase of PCT application PCT/EP2018/075453 having an international filing date of Sep. 20, 2018, and published as WO 2019/115034 on Jun. 20, 2019, which claims benefit of European patent application No. 17206421.4 filed Dec. 11, 2017. The contents of the above patent applications are incorporated by reference herein in their entireties.

BACKGROUND OF THE INVENTION

The invention relates to a process for treating an aqueous fluid comprising a biodegradable organic substance, the process comprising a batch reaction stage wherein biodegradable organic substance is converted by anaerobic microorganisms, thereby forming biogas (a gas mixture generally mainly comprising methane and carbon dioxide). The invention further relates to an installation for microbiologically treating an aqueous fluid comprising biodegradable organic substance.

A process for producing biogas from waste containing organic biomass in an Anaerobic Sequencing Batch Reactor (AnSBR) was developed in the early 1990s. U.S. Pat. No. 5,185,079 A) relates to a single vessel AnSBR operated in cycles having four main stages: Feed, Reaction, Settling and Decanting; with sludge removal when necessary. Advantages of AnSBR include a high degree of process flexibility in terms of cycle time and sequence, the possibility to operate without clarifiers are required, and the possibility to operate with relatively simple instrumentation. Furthermore, the feast/famine regime induced by sequential operation promotes the degradation of slowly degradable particulate substrates (suspended solids, oils fats and greases) and/or relatively recalcitrant compounds, as well as to an enhanced bio-flocculation. In addition, the sequential operation leads to the development of good settling sludge due to a natural selection pressure on that bad settling sludge. As a result, there an efficient solids separation is promoted, thus leading to long solids retention times (SRT) and efficient conversion of organic substrates to methane and carbon dioxide.

Despite being developed a long time ago, the industrial implementation of AnSBR is limited. The main limitations of AnSBR seems to be the misapplication of this configuration, errors in design, uncertainty on sludge settleability control as well as the challenge behind the management of batch volumes (of fluids and gases) which results in the requirement of big buffer tanks and gas storage units.

Few attempts are known to develop variations of AnSBR configuration to take advantages of the benefits mentioned above. For example a process called a "temperature-phased AnSBR" has been proposed, wherein two reactors are operated in series. The first reaction operates at a thermophilic temperature (55° C.) and the second at a mesophilic level (35° C.).

U.S. Pat. No. 5,599,450 A relates to another configuration that has been developed for the AnSBR concept is the anaerobic upflow batch reactor. This system aims to provide a plug flow through an anaerobic waste streams treatment reactor distributing waste streams evenly at bottom of reactor and collecting the waste streams at the upper level to produce upward plug flow through the reactor during filling, recycle and decanting and minimize horizontal mixing. According to the inventors such plug flow encourages growth of heavier biomass near the bottom of the reactor where substrate concentration is highest and discourages growth of light biomass near the top of the reactor where substrate concentration is lowest.

Despite various advantageous of treating an aqueous waste containing organic biomass in an AnSBR, known systems also have typical intrinsic problems. The reaction stage, during which biogas is formed from the organic biomass and the settling stage, are carried out sequentially. During settling, solids move in the direction of the bottom of the reactor, where a (concentrated) sludge forms, and in the upper part of the reactor a supernatant is formed (are fluid aqueous phase, which has a reduced solid particle content compared to the solid particle content of the fluid contents (suspension), and which is preferably essentially free of solid particles, after sufficient settling, supernatant is withdrawn from the reactor as an effluent. A long settling time is desirable for obtaining a supernatant which has a low solid particles content or is essentially free thereof, because this facilitates downstream processing of the effluent. At a given cycle time of the process, settling duration is thereby a limiting factor in the total break-down capacity of organic substances and the biogas production capacity, because it reduces the time available for the reaction phase. Further, processes carried out in an AnSBR characteristically have a fluctuating production rate of biogas. At the beginning of a process cycle (feeding stage) the biogas production rate will gradually increase until a maximum is reached (usually at or near the end of the feeding stage or at an early part of the reaction stage). After a maximum biogas production rate has been reached, the reaction stage is typically continued till the production rate reaches a lower threshold value, after which the settling stage is commenced. During the settling stage some biogas production usually still occurs, but at that stage the biogas production rate generally further decreases, to become lowest (potentially 0) during the decantation phase (wherein effluent is withdrawn). As a result of the fluctuations in biogas production rate, the biogas flow from the reaction system fluctuates significantly, which is undesired, amongst others in view of further treating the biogas stream downstream of the AnSBR and/or in providing a constant biogas supply for further use, e.g. in the production of energy.

BRIEF SUMMARY OF THE INVENTION

The present inventors found a way to address one or both of these problems. The inventors realized in particular the advantage of the way to address these problems in an anaerobic process. However, they consider processes operated under non-anaerobic conditions may benefit from their findings too.

Accordingly, the invention relates to a process for treating an aqueous fluid whereby a biogas is produced in an installation comprising a bioreactor (1) and a separate container (2), wherein the process comprises (i) a bioreactor feeding stage, thereafter (ii) a batch reaction stage, wherein biogas is formed and formed biogas is temporarily stored in the separate container (2), and thereafter at least one further stage (iii) comprising a settling stage and/or an aqueous fluid effluent discharge stage, wherein the biogas stored in the separate container (2) is used to reduce fluctuations in a biogas exit flow (15) from the installation.

Said stages are usually operated under essentially anaerobic conditions.

BRIEF DESCRIPTION OF THE DRAWINGS

FIG. 4 (I) shows a bioreactor feeding stage, FIG. 4 (II) shows the batch reaction stage, and FIG. 4 (III) shows the settling stage.

FIG. 5 (I) shows a bioreactor feeding stage, FIG. 5 (II) shows a first batch reaction stage, FIG. 5 (III) shows a first batch reaction stage, FIG. 5 (IV) shows the fluid effluent discharge stage, and FIG. 5 (V) shows the bioreactor discharge stage.

DETAILED DESCRIPTION OF THE INVENTION

Figure 1:
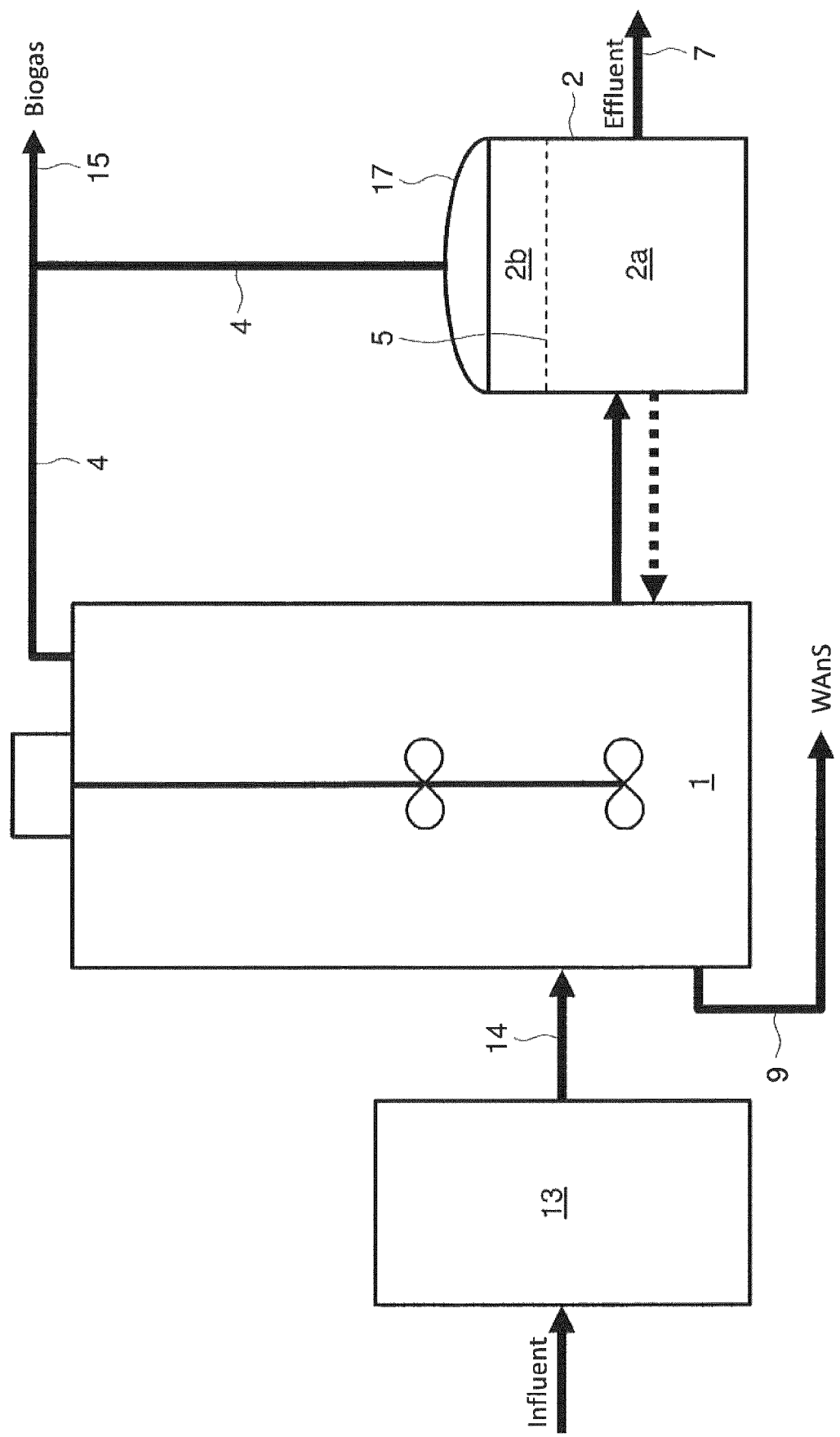
FIG. 1 schematically shows a general set-up of an installation (for use in a process) according to the invention.

In particular, the present invention relates to a process for microbiologically treating an aqueous fluid comprising a biodegradable organic substance, wherein at least part of said biodegradable organic substance is converted by micro-organisms, in particular anaerobic micro-organisms, thereby forming biogas, in an installation comprising a bioreactor, in particular an anaerobic bioreactor (1), said bioreactor (1) containing an aqueous suspension, the suspension comprising a liquid phase and a solid phase, the suspension containing said micro-organisms, the installation further comprising a separate container (2), for holding treated aqueous fluid (2a) from the bioreactor (1), and for holding biogas (2b) from the bioreactor (1) the process comprising
  (i) a bioreactor feeding stage, wherein the aqueous fluid comprising the biodegradable organic substance is fed into the bioreactor (1), and thereafter
  (ii) a batch reaction stage, wherein biodegradable organic substance is converted by the micro-organisms in the bioreactor (1), thereby forming biogas, during which batch reaction phase a biogas exit flow out of the installation is maintained, wherein at least during a part of the batch reaction phase at least a part of the formed biogas is temporarily stored in the separate container (2), followed by
  (iii) at least one further stage, which at least one further stage comprises a settling stage and/or an aqueous fluid (preferably liquid) effluent discharge stage and wherein the biogas (2b) stored in the container (2) is used to reduce fluctuations in the biogas exit flow (15) during the batch reaction stage or thereafter.

The holding space inside the separate container can be divided at least conceptually into a first section for holding the aqueous fluid (section 2a) and a second section for holding the biogas (section 2b). When both biogas and aqueous fluid are present in the container (2), the interface (5) between section 2a and section 2b is usually the gas-fluid interface between biogas and aqueous fluid. Thus, this interface does not need to be fixed and the sizes of first and second section can vary during the various stages of the process of the invention.

Generally, the stages of the process according to the invention are repeated a plurality of times. Each single sequence comprising a stage (i), a stage (ii) and a stage (iii), wherein feeding, reaction, settling and decanting (effluent withdrawal) are accomplished forms a so called process cycle (or in short 'cycle')/At least after the first cycle (wherein the process is started-up) an at least substantially constant biogas exit flow is generally maintained during said stages.

Generally, except for when starting-up the system from the beginning (e.g. on first use or after maintenance), the reactor generally already contains the biogas producing microorganisms. Once the microorganisms have been provided into the reactor, they generally don't need to be introduced into the reactor anymore during subsequent cycles of the process.

The invention further relates to an installation for microbiologically treating an aqueous fluid comprising biodegradable organic substance, in particular an installation for use in a process according to the invention, wherein the installation comprises a bioreactor, typically an anaerobic bioreactor (1), the bioreactor comprising an agitator for agitating the aqueous fluid in the bioreactor (1) and a separate container (2), the separate container (2) comprising
  a first section (2a) for holding treated aqueous fluid from the bioreactor (1) which first section comprises an inlet for the treated aqueous fluid that is connected to an outlet for treated aqueous fluid from the bioreactor (1) via a closable conduit (3) and an outlet for removing contents of the first section via a closable conduit (6) and
  a second section (2b) for holding biogas, comprising an inlet for biogas that is connected to an outlet for biogas from the bioreactor (1) via a conduit (4) the installation further comprising an inlet (14) for fluid aqueous waste stream into the installation, an outlet (15) for biogas from the installation and a discharge (7) for fluid aqueous effluent and an outlet (9) for sludge from the installation.

An installation according to the invention is particularly suitable for use in the microbiological treatment of an aqueous fluid comprising a biodegradable organic substance whereby biogas is formed from said biodegradable substance, preferably in a process according to the invention.

In an advantageous embodiment, the separate container comprise a mechanism, in particular a stirrer. This mechanism is typically present in the section (2a). It can be used to break down any scum formed during settling, when the tank is used for such purpose.

In an advantageous embodiment the section 2a of the separate container 2 comprises a liquid-solid separator, preferably a settler, having tilted internals adapted to enhance the settleability of solid particles in the aqueous fluid (such as a suspension or sludge). The tilted internal can e.g. by tilted tubes or tiled plates, which can be flat or corrugated. Such tilted internals further promote the separation of biogas from the liquid and solid phases. The tilted internals are typically placed in an angle of 55 to 60° and placed at least 2-10 cm distance from each other to enhance separation and avoid clogging of the separator.

Preferably, the liquid-solid separator is placed in a middle part of the external separator.

In a further embodiment, the liquid-solid separator could occupy at least about 50% of the working volume of the external separator, more preferably at least about 75%, even more preferably about at least 90%, most preferably about 100% of the working space of the external separator.

It is a major advantage of the present invention that it allows to simultaneously carry out the conversion of organic substance by the micro-organisms in the bioreactor (1) and the settling of solid particles in the treated fluid in the separate container (2).

Accordingly, in a much preferred embodiment, during at least a part of the (ii) batch reaction stage the separate container (2) is used as a settler wherein solid particles are allowed to settle from an aqueous suspension present in the container.

Accordingly, in a much preferred embodiment, during the batch reaction stage (ii) biogas is formed in the bioreactor (1) and simultaneously any aqueous suspension originating from the bioreactor (1) that has previously been introduced into a first section (2a) of separate container (2) is allowed to settle in said container (2).

Thus, in a much preferred embodiment, the batch reaction stage (ii) and the settling stage are carried out simultaneously for at least a (substantial) part. This enables much longer settling periods (2-3 times longer than in a conventional AnSBR) without compromising the duration of the reaction phase, which is a major advantage over a conventional AnSBR.

In an embodiment, the present invention allows to have the feeding stage and the decanting stage to be carried out simultaneously for at least a substantial part. It is also possible to achieve simultaneous feed and decanting phase, thereby reducing the number of stages required per cycle and simplifying the process, which is also a major advantage over a conventional AnSBR (see e.g. FIG. 2 and FIG. 4).

The operation of stages simultaneously allow for shorter overall cycle duration which reduces the batch volume per cycle and the required volume of the buffer tank (13) to achieve a certain processing capacity.

The container (2) having a first section (2a) for an aqueous fluid and a second section for biogas (2b) is also of relevance in allowing at least partly simultaneously carrying out the reaction stage and the settling stage or the at least partly simultaneously carrying out the feeding stage and the decanting stage, as will be further illustrated below.

The second section (2b) serves as a storage for biogas during a period of the process wherein the biogas production is relatively high, and as a supply for biogas to the biogas exit-line (15) from the system, thereby contributing to a more constant biogas flow throughout the process, compared to conventional AnSBR. It further allows for homogenization of the biogas composition, which may vary during production.

The design of an installation (used in a process) according to the invention is also advantageous in that the headspace of the bioreactor (1), (i.e. the upper part inside the reactor above the fluid phase, wherein biogas is present) is connected via a channel with the second section (2b) of the container. Hereby a gas-tight system is provided, whereby the substantial risk of odors and biogas emissions, a recurrent issue, especially in anaerobic contact reactors, is eliminated.

Figure 6:
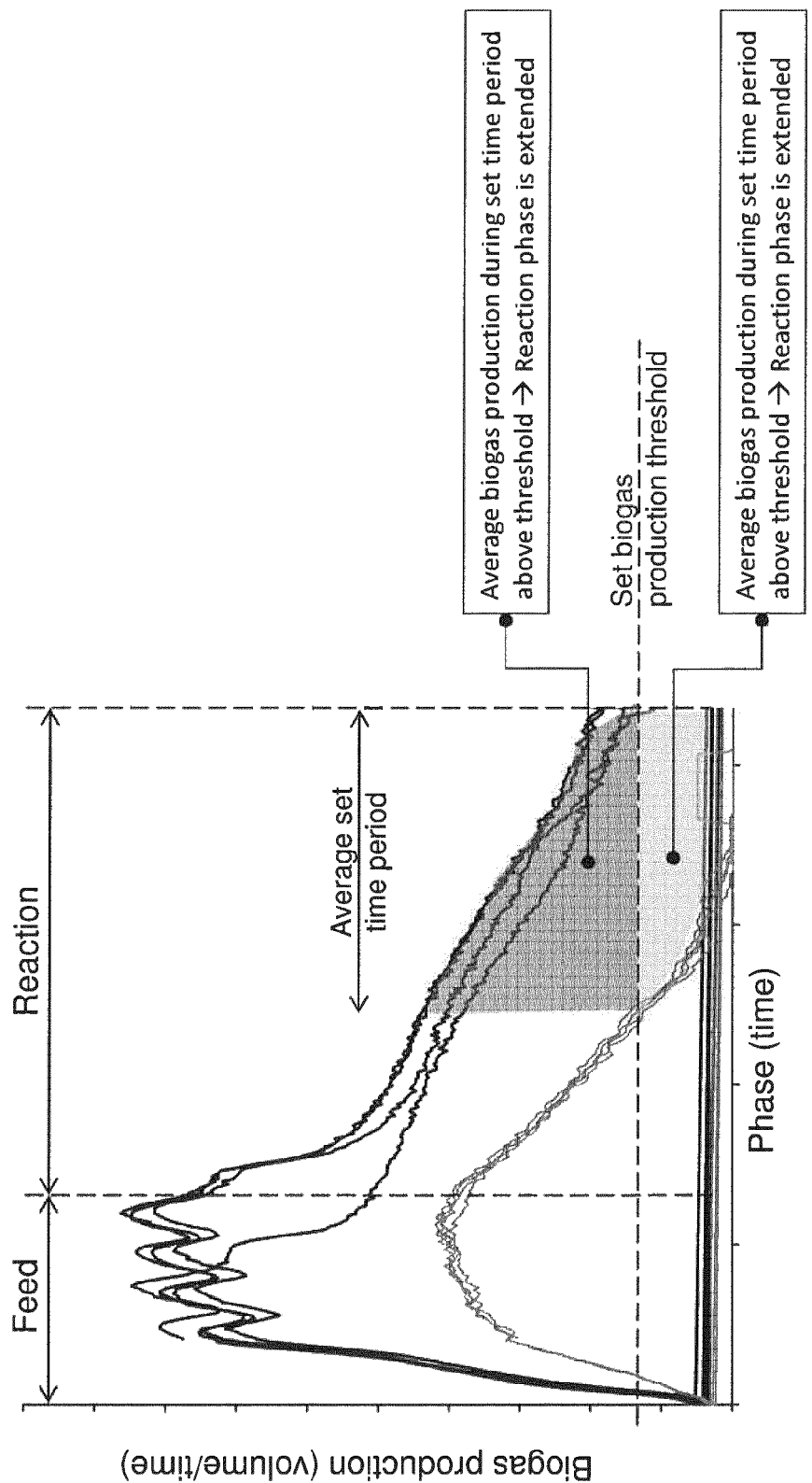
FIG. 6 shows two examples of a biogas production profile during a cycle of a process according to the invention.

A process according to the invention allows convenient real-time system monitoring, optimization and phase automatization based on sequential biogas production profiles (biogas production rate as function of time, see e.g. FIG. 6). System capacity can be monitored real-time by following the biogas production in each profile.

In a process according the invention the system load and reaction/settling phase duration can be adjusted and optimized based on a "standard" biogas profile, i.e. a benchmark/reference biogas profile as defined by an operator for a specific process of interest. This is a major advantage over processes that are continuously operated, such as treatment in an anaerobic membrane reactor (AnMBR) or in a continuous stirred tank reactor with a dissolved biogas flotation unit (DBF).

The term "or" as used herein is defined as "and/or" unless specified otherwise.

The term "a" or "an" as used herein is defined as "at least one" unless specified otherwise.

When referring to a noun (e.g. a compound, an additive, etc.) in the singular, the plural is meant to be included.

The term "(at least) substantial(ly)" is generally used herein to indicate that it has the general character or function of that which is specified. When referring to a quantifiable feature, this term is in particular used to indicate that it is at least 50%, more in particular more than 75%, even more in particular more than 90% of the maximum that feature. The term 'essentially free' is generally used herein to indicate that a substance is not present (below the detection limit achievable with analytical technology as available on the effective filing date) or present in such a low amount that it does not significantly affect the property of the product that is essentially free of said substance. In practice, in quantitative terms, a product is usually considered essentially free of a substance, if the content of the substance is 0-1 wt. %, in particular 0-0.5 wt. %, more in particular 0-0.1 wt. %.

In the context of this application, the term "about" means generally a deviation of 15% or less from the given value, in particular a deviation of 10% or less, more in particular a deviation of 5% or less.

As used herein "biodegradable organic substance" is organic substance that can be converted by biomass in the reactor, typically under essentially anaerobic conditions, in particular into biomass or methane.

The term "fluid" is used herein for liquids and mixtures of liquids and at least one other phase, such as suspensions, that flow without applying external pressure (pressure other than gravity).

As used herein "organic substance' is any organic substance that is chemically oxidisable, as can be determined by the Chemical Oxygen Demand (COD) test, as described in ISO 6060:1989. A content of organic substance is generally expressed in g COD, i.e. grams oxygen that is consumed for the oxidation of the organic substance.

The skilled person is familiar with terms like 'upper', 'lower', 'middle', 'at bottom', 'near bottom', 'at top' and 'near top'. Generally these are read in relation to another, and the skilled person will be able to reduce implementation thereof to practice, based on common general knowledge, the information and citation disclosed herein, and the specifics of a unit (such as bioreactor, a separate container, or a volume of matter contained in the bioreactor or a section) of the installation.

As a rule of thumb, unless follows differently from the context, 'near' a certain reference point (such as 'bottom' or 'top') usually means 'at a relative height of up to +/−20%' from the reference point', in particular s 'at a relative height of up to +/−15%' from the reference point' more in particular 'at a relative height of up to +/−10%' from the reference point. The relative height is the distance from the bottom divided between the total height of the unit (height difference between bottom and top).

As a rule of thumb, unless follows differently from the context, an 'upper' part generally means in the upper ½, and in particular in the upper ⅓ of the unit, a 'lower' part generally means the lower ½ of the unit and in particular the lower ⅓ of the unit. When referring to a middle part, this in particular means the middle ⅓ of the unit (from ⅓ of the bottom to ⅓ from the top).

For the purpose of clarity and a concise description features are described herein as part of the same or separate embodiments, however, it will be appreciated that the scope of the invention may include embodiments having combinations of all or some of the features described. Terms used herein that are not specifically defined herein are as defined in WO 2013/139823, or—if not defined therein—used in accordance with common general knowledge.

FIG. 1 schematically shows a general set-up of an installation (for use in a process) according to the invention. Upstream of the bioreactor (1) usually a buffer container (13) is present wherein the aqueous fluid comprising the biodegradable organic substance (influent) can be stored before being introduced in the bioreactor. Such buffer container (usually a tank) is generally present, when treating a continuous waste stream, because the process according to the invention is operated under batch conditions, at least with respect to the influent (aqueous fluid). Further, the presence of the buffer container (13) allows to buffer hydraulic variations and variations in organic matter content of the influent. Biogas (15) is generally essentially continuously withdrawn from the installation. Dependent on the configuration, aqueous effluent (7) can also be essentially continuously withdrawn from the installation.

The separate container (2) comprises at least two sections ((2a) and (2b)) The first section (2a) is adapted to hold aqueous fluid, such as a suspension and/or aqueous liquid withdrawn from the bioreactor (1). The second section (2b) is adapted to hold biogas, which can be fed from the bioreactor into and withdrawn from the section (2b) via line (4). Generally, the second section (2b) is positioned above the first section (2a). The two sections usually both form part of a single open space inside the container. Thus, depending on the volume of gas respectively aqueous fluid desired to be present in the container at a certain stage of the process a larger or smaller part of the internal space of the container can be used either for holding the gas or the aqueous fluid. In a specific embodiment the first and the second section of container (2) are separated by a separating structure that is essentially impermeable to biogas, liquids and solids. The upper-side of the first section is usually the lower-side of the second section. It is an advantage of the present invention that in general no settler internals are needed inside (the first section (2a) of) the container (2), also not in case the first section is used for settling. Nonetheless, if desired such internals can be provided.

At least upper cover of the second section (2b) is usually expandable, such that it can be inflated by the introduction of biogas and deflated by the removal of biogas. In order to accomplish this, a flexible upper cover is provided of which at least a substantial part can move up and down.

Preferably this is achieved by a double membrane. Double membranes are generally known in the art. The double membrane has a first (upper) membrane and a second (lower) membrane. The adjacent sides of the membranes define an inflatable/deflatable space (the inter-membrane space). By introduction of a gas, e.g. air, the inter-membrane space can be increase and by removal of the gas, said space is decreased. Thus, usually a gas pump is connected to the inter-membrane space to introduce or remove gas into said space. Thus, the double membrane can be used to displace biogas inside container 2 toward the biogas exit or to maintain a desired gas pressure inside container 2.

Accordingly, in a preferred embodiment the upper cover (17) of separate container (2) comprises an inflatable double membrane, having a first and a second membrane wherein a upon inflation a space is created between said first and second membrane. In a particularly preferred process of the invention the space between the first and the second membrane is inflated or deflated so as to maintain a pressure of the biogas (2b) inside the separate container (2) within a defined range. In a particularly preferred process of the invention, the space between the first and the second membrane is increased in order to cause biogas (2b) stored in the container (2) to the biogas exit (15) when the biogas exit flow is below a lower threshold value and/or wherein the space between the first and the second membrane is decreased to allow storage of more biogas when the biogas production rate is above an upper threshold value.

The bottom of the container can e.g. be horizontal, skewed or conical. A skewed or conical bottom with an outlet at or near the lowest point of the bottom may be desired for efficient (fast and/or essentially complete) removal of a thick-viscous substance, such as a concentrated sludge or slurry from the container.

The container does not require any dedicated internals to accomplish settling or to withdraw contents from the container. E.g. fluids can be withdrawn via a fixed outlet. In a specific embodiment, the container comprises a floatable decanter, which allows removal of aqueous effluent from the container at or near the surface of the aqueous phase inside the container. This is in particular an advantage in an embodiment, wherein the container contains a suspension with a relatively high solids content, as during settling the solids contents will be lowest at and near the surface of the aqueous phase.

Further, in a process according to the invention it is possible to withdraw biogas from the second section (2b) and feed it to the biogas exit (15) using displacement by the fluid fed into the first section (2a).

The first section (2a) of the separate container (2) is provided with an exit for effluent and with a recycle line (6) to return sludge or aqueous fluid to the bioreactor (1). The installation further comprises an exit line (9) for surplus sludge (WAnS). This is usually provided at the bioreactor (1), with an outlet for the WAnS at or near the bottom of the bioreactor (1).

The aqueous fluid treated in a process according to the invention can in principle be any aqueous fluid that comprises an organic substance that is biodegradable, in particular under anaerobic conditions. Preferably, the aqueous fluid is selected from the group of municipal waste water, industrial waste water, sewage water, aqueous fluid waste from fermentation processes (such as residual fermentation broth), aqueous slurries and aqueous sludges. In terms of water content of a waste stream treated in a process according to the invention, this may vary in a wide range. Generally, the water content of the aqueous fluid to be treated is more than 80 wt. %, in particular at least 80 wt. %, more in particular 90 wt. % or more of the total weight of the fluid. Usually, the water content is 99.9 wt. % or less, preferably 99.5 wt. % or less, more preferably 99 wt. % or less, in particular 98 wt. % or less, more in particular 96 wt. % or less. The total organic substance content of the aqueous fluid to be treated is usually 0.1 g COD/l or more, preferably in the range of 0.3-100 g COD/l, in particular in the range of 5-50 g COD/l.

A process according to the invention is also particularly suitable to treat waste streams with a relatively high content of fat, oil and/or grease (FOG) and/or a relatively high content of suspended solids (TSS). TSS is the solid fraction of the fluid that is obtained by filtering a known weight or volume of the fluid using a 1.6 µm filter (dead end filtration), taking the retentate, washing the retentate with distilled water, drying the washed retentate, and determining the residual dry weight. The TSS may thus include inorganic substance in addition to organic substance. To distinguish the organic substance from the inorganic substance, the sample is burned at 550° C., all the organic substances are burned and the sample residual consist in inorganics. The burning test is usually a practical alternative to the COD test. For instance, a process according to the invention (operated under conditions wherein the solids in the bioreactor are at least substantially flocculent) is also advantageous—e.g. compared to conventional processes operated under conditions wherein the solids in the bioreactor are at least substantially granular—for treating a fluid waste having a TSS content of 0.5 g/l or more, in particular 1.0 g/l or more, preferably 1.5-30 g/l, in particular 2.0-20 g/l and/or a FOG content of 50 mg/l or more, in particular 0.1-2 g/l. One such advantage is a more efficient conversion of suspended solids by the micro-organisms. A second advantage, especially at a high content of FOG, is a reduced tendency or complete avoidance of flotation of solids (including micro-organisms), typically caused by a high FOG content in granular systems, which may result in the wash-out of micro-organisms.

Examples of aqueous fluids which are particularly suitable to be treated in accordance with the invention are aqueous wastes from a dairy food production or processing (e.g. the production/processing of milk, cheese, butter), a beverage production or processing (e.g. wine, beer, distilled beverage, fruit juice, milk), a biofuel production or processing, a chemical plant or an aqueous waste from an agricultural facility.

The skilled person will know how to determine a suitable liquid content, solids content and micro-organism content in the bioreactor, based on common general knowledge, the information disclosed herein and the citations mentioned herein.

A process according to the invention comprises at least three stages: a first stage is the bioreactor feeding stage, a second stage is the batch reaction stage. The process further comprises a settling of solids from the treated fluid, whereby a treated aqueous fluid phase is obtained from which at least a substantial part of the solid phase is removed. Further the process comprises a removal (decantation) of aqueous fluid, preferably liquid effluent, from the installation wherein the process is carried out. Dependent on the mode of operation, settling and/or removal are carried out in parallel with the feeding stage and/or the reactor stage or carried out in at least one further stage, comprises the settling s and/or an aqueous fluid effluent discharge stage.

Next a number of preferred modes of operation will be discussed, wherein is illustrated how the feeding, reaction, settling and decantation can be carried out in accordance with the invention.

Figure 2:
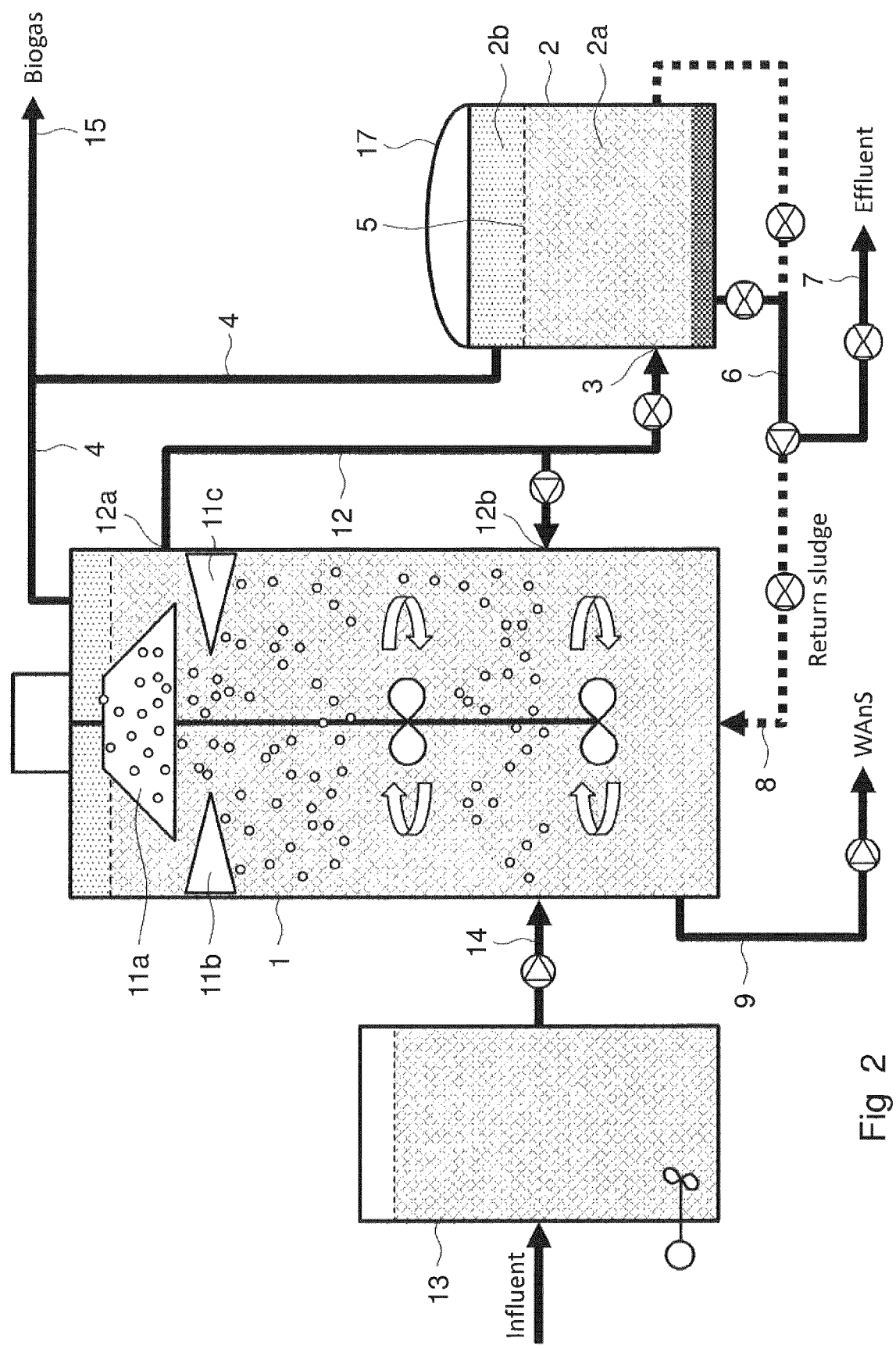
FIG. 2 schematically shows a general set-up of an installation (for use in a process) according to the invention.
Figure 4:
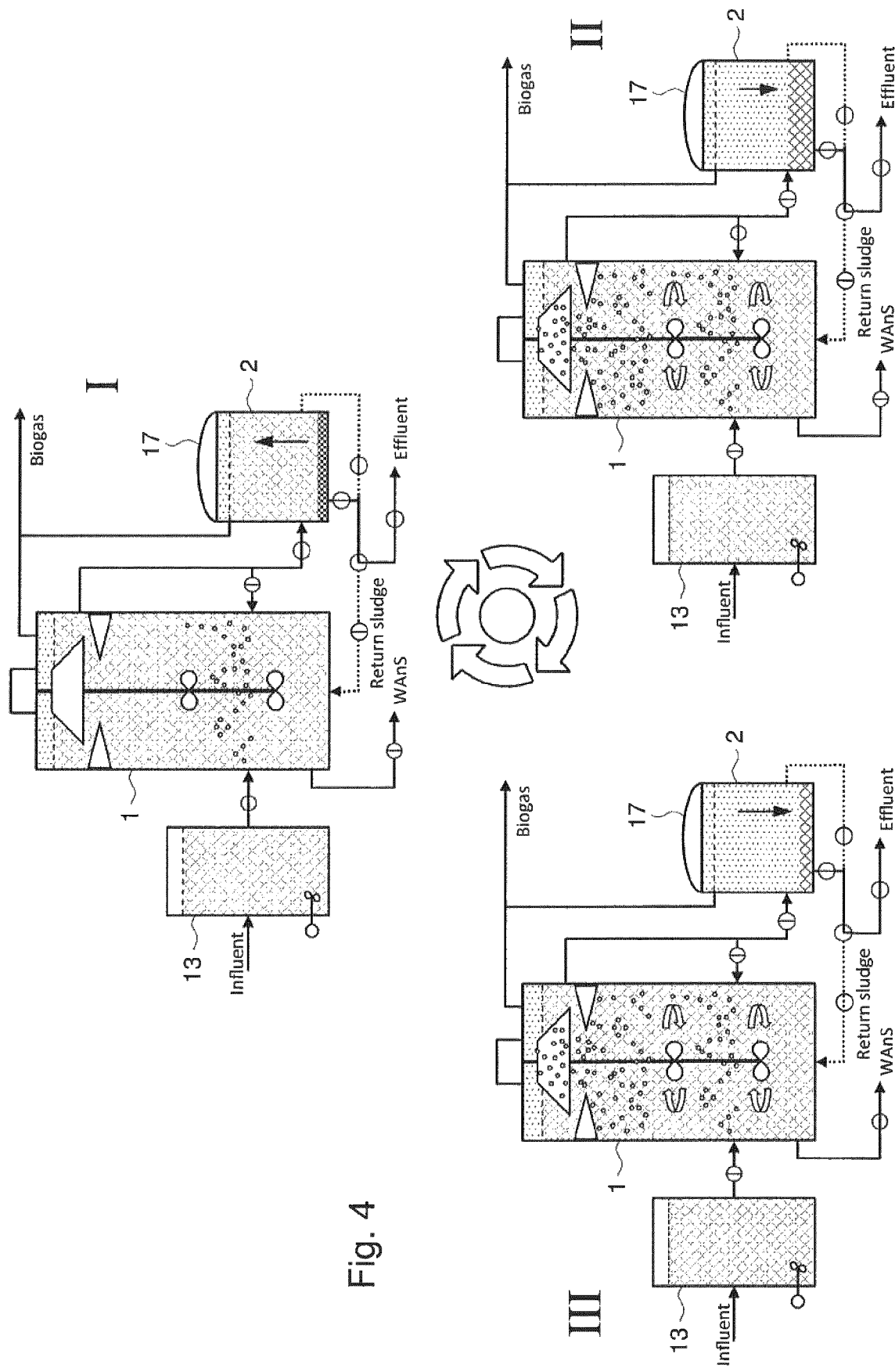
FIG. 4 schematically shows a general set-up of an installation (for use in a process) according to the invention.

A first preferred embodiment is schematically illustrated by FIG. 2 and FIG. 4. Besides other advantages, such as mentioned above, a major advantage of this embodiment is that (after an initial process cycle comprising the three described stages) it allows avoiding excessively high peaks in gas flow, and preferably an at least substantially constant gas flow and/or a continuous, preferably at least substantially constant aqueous effluent flow throughout a process cycle. Further, in this embodiment, the first section ($2a$) of container (2) serves as a safety sludge return reservoir, as a safeguard to unwanted loss of biomass, if there is any unexpected malfunctioning. Furthermore, this embodiment is particularly advantageous for establishing a shorter overall cycle duration.

In this embodiment, the bioreactor (1) comprises an internal separator system (11) present inside the bioreactor (1) which internal separator system (11) is positioned above an inlet (14) for aqueous fluid comprising the biodegradable substance and below an outlet (16) for treated aqueous fluid, out of the bioreactor. In this embodiment, the inlet (14) is typically at a lower part of the bioreactor (1).

The internal separator system (11) is adapted to separate gas and solids from liquid, whereby a fluid phase is formed that has reduced content of solid particles (and thus reduced suspended solids content) compared to the content of solid particles of the aqueous suspension at the beginning of the settling stage), preferably a fluid phase that is at least substantially free of solid particles. The internal separator system usually contains an internal deflector or other means to create an essentially biogas-free volume at and near the outlet ($12a$) for aqueous fluid out of the bioreactor. Suitable internal separator systems are generally known in the art, such as internal separator systems originally designed for up-flow anaerobic sludge bed reactors (UASB reactors), see e.g. G. Lettinga et al: Use of the upflow sludge blanket (USB) reactor concept for biological wastewater treatment, especially for anaerobic treatment, in Biotechnology and Bioengineering, Volume 22, Issue 4 Apr. 1980, Pages 699-734, available on internet via "http://onlinelibrary.wiley-.com/doi/10.1002/bit.260220402/full.

In this embodiment, the inlet (14) for the aqueous fluid is typically present in a lower part of the bioreactor, in particular at or near the bottom. The outlet (16) is typically present in an upper part of the bioreactor, yet at or below the interface between the suspension and the headspace (comprising biotas). By positioning the inlet for aqueous fluid (14) and the outlet ($12a$) remote from each other, such that a liquid can be withdrawn from the bioreactor (1) that is essentially free of a gas phase and preferably essentially free of solids. In this embodiment. generally, during normal operation a liquid that is essentially free of a solid phase, or a fluid that at least generally has a substantially reduced solids content compared to the suspension in the reactor is withdrawn. The withdrawn liquid/fluid is generally essentially free of a gas phase.

The separator system (11) is adapted to obtain an aqueous fluid phase in the upper part of the bioreactor with a reduced solid phase content (and which may be essentially free of solid particles). Further the system is adapted to separate biogas from the aqueous fluid phase.

The aqueous fluid/liquid from which biogas and solid particles have been removed is collected in an upper part of the bioreactor (1), i.e. above the separator system (11).

In (i) the bioreactor feeding stage of this first preferred embodiment, the aqueous fluid comprising the biodegradable organic substance is fed into the bioreactor (1) via said inlet (14) for aqueous fluid. This is illustrated by FIG. 4, drawing I. In this embodiment, feeding is generally done without substantial agitation other than any agitation caused by the feeding, at least at the start of the second cycle and further cycles of the process of the invention, when treated aqueous fluid (preferably aqueous liquid) from a previous process cycle is present in the upper part of the bioreactor. Due to the absence of substantial agitation, mixing of treated fluid (preferably liquid) present above the internal separation system (11) with suspension/sludge present below the internal separation system (11) in the bioreactor (1) is essentially avoided. Thus, separated aqueous fluid (preferably liquid) is withdrawn from the bioreactor (1) through outlet (12a) and at least part thereof is fed into the first section (2a) of the separate container (2), via inlet (3). In this embodiment, the outlet (12a) for the fluid (preferably liquid) is generally positioned at or near the interface of aqueous fluid and biogas, whereby aqueous fluid (preferably liquid) can be withdrawn that is essentially free of solid particles and essentially free of a gas phase, i.e. above the separator system (11).

The withdrawal (decanting) of fluid (preferably liquid) from the bioreactor can be done continuously during the bioreactor feeding stage, intermittently, or as a batch. Further, simultaneous withdrawal of fluid (preferably liquid) effluent from the first section (2a) of the separate container (2) via line (6) and effluent (7) is possible. As a safeguard, the first section (2a) also acts as a buffer, if for some reason, an unacceptable amount of solid particles is withdrawn from the reactor. If the solid particle content in first section becomes higher than tolerable, the design of the system allows the contents of the first section to be subjected to a settling step, after which the solids are returned to the reactor. Alternatively the aqueous fluid contents of section 2a as a whole are returned to the reactor.

Since in this preferred process the aqueous fluid in the container (2) generally has a low viscosity (e.g. a viscosity that is about the same as pure water) essentially complete removal of fluid is efficiently accomplished without special measures. For instance, the bottom of the container can be of a simple design, such as essentially horizontal (flat), although other designs, e.g. a conical design also works well.

Once the second section (2b) has been provided with biogas (typically after a first cycle of operating the process) biogas from the second section (2b) can be used to provide at least part of the biogas exit flow (15) during the feeding stage, if needed to maintain sufficient biogas exit flow. Typically, this would be at the very beginning of a feeding stage, when biogas production rate is still relatively low. Also during decanting biogas from section 2b can be used to help avoiding negative pressures when decanting. At the feeding stage, there is generally no withdrawal of WAnS (9).

After feeding is completed, (ii) the batch reaction stage starts. This stage is illustrated in the drawing II of FIG. 4. At this stage, there is generally no fluid flow into the bioreactor (via 14). At this stage, there is generally no fluid flow between bioreactor (1) and first section (2a). At this stage, surplus WAnS (9) may be withdrawn, when desired.

Generally, during the batch reaction stage, the aqueous suspension in the bioreactor (1) is agitated; whereby the aqueous suspension comprising biodegradable organic substance and micro-organisms extends to essentially the full fluid volume of the bioreactor, which is advantageous for efficient conversion of organic matter.

Due to the presence of the separator system (11), the solids content above the separator system tends to be lower than below the separator system, if no further measures are taken. Thus, if desired, aqueous suspension is withdrawn from the bioreactor (1) through outlet (12a) positioned above the internal separator system (11). This can be the same or a different outlet as used for withdrawing aqueous fluid from the bioreactor during the feeding phase. This withdrawn suspension is then generally recycled to the bioreactor via recycle (12b) of which the inlet is positioned below internal separator system (11). This recycle is advantageous to keep the suspension more homogeneous throughout the suspension inside the bioreactor.

During the batch reaction stage, aqueous fluid (preferably liquid) stored in the first section (2a) is generally withdrawn from the installation via the outlet (6) for aqueous fluid through effluent outlet conduit (7). It should be noted that in this embodiment, the first section (2a) also serves as a safeguard buffer, in case (due to some error) solids are withdrawn with the aqueous fluid (preferably liquid) from the bioreactor. In such case, if the solid phase content in first section becomes higher than what is maximally allowed for a certain treatment, during at least a part of the batch-reaction stage, the contents of the first section are allowed to settle (whilst no effluent withdrawal takes place), after which the solids are returned to the reactor, or the contents as a whole are returned to the reactor.

After (ii) the batch reaction stage, (iii) the settling stage follows. Settling is carried out inside the bioreactor (2). This stage is illustrated by drawing III of FIG. 4. In this stage, there is generally no flow of fluid from the bioreactor to first section (2a) of the separate container (2)

During this stage, conversion of biodegradable organic substance by the micro-organisms, in particular the anaerobic micro-organisms, may continue, but the biogas production rage will generally be substantially lower than at the beginning of the batch-reaction stage, and then gradually further decrease due to depletion of substrate (the biodegradable organic substance).

During the settling stage solids in the bioreactor are settled, whereby an aqueous fluid forms above the internal separator system (11), with a reduced solid phase content. Settling is preferably continued at least until a fluid phase is present that is essentially free of particles that are visible with the naked eye (particles with a size >0.1 mm) that can subsequently be with withdrawn as the aqueous fluid (liquid), during a subsequent feeding stage in the next cycle of the process. During settling, agitation intensity is reduced or agitation is stopped. During settling, there is generally no recycling from fluid from the upper part of the reactor to the lower part of the reactor (from 12a to 12b). Thus, the internal separator system (11) is allowed to at least substantially separating the suspension into a more concentrated suspension in the part of the bioreactor below the separator system (11) and the fluid phase above the separator system, that has a reduced solid content, and which is preferably essentially free of solid particles.

During the settling stage, the aqueous fluid (preferably liquid) stored in the first section (2a) is withdrawn from the installation via the outlet (6) for aqueous fluid.

During settling, a concentrated sludge is formed below the separator system (11) in the middle and, in particular, in the lower part. The inventors found that, here, the best settling sludge (best in terms of capacity to form flocs and thus settle quicker leaving a cleaner effluent above the settled suspension interphase).

Further, when needed, biogas from the second section (2b) is used to provide at least part of the biogas exit flow (15) during the settling stage.

Figure 3:
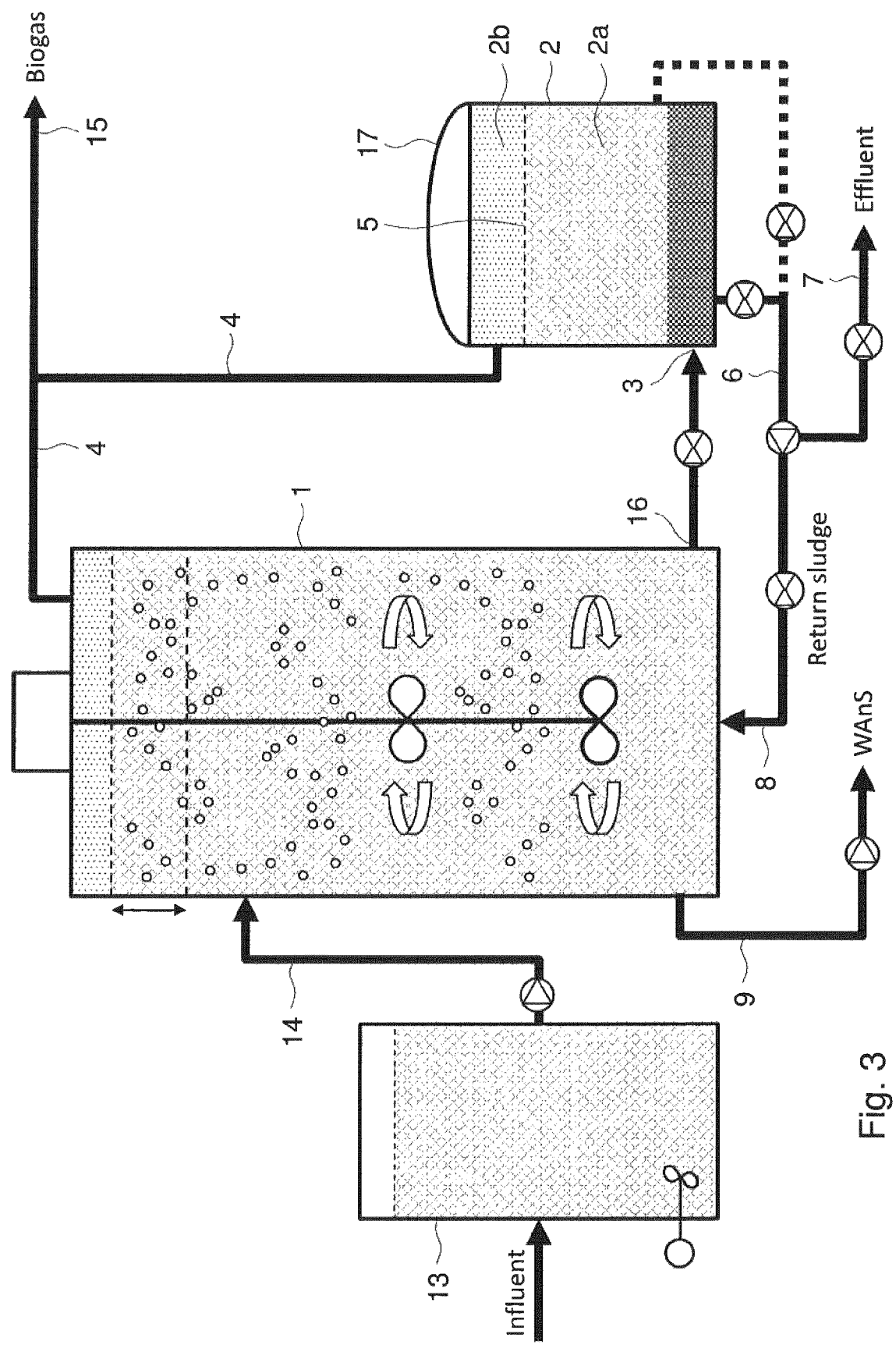
FIG. 3 schematically shows a general set-up of an installation (for use in a process) according to the invention.
Figure 5:
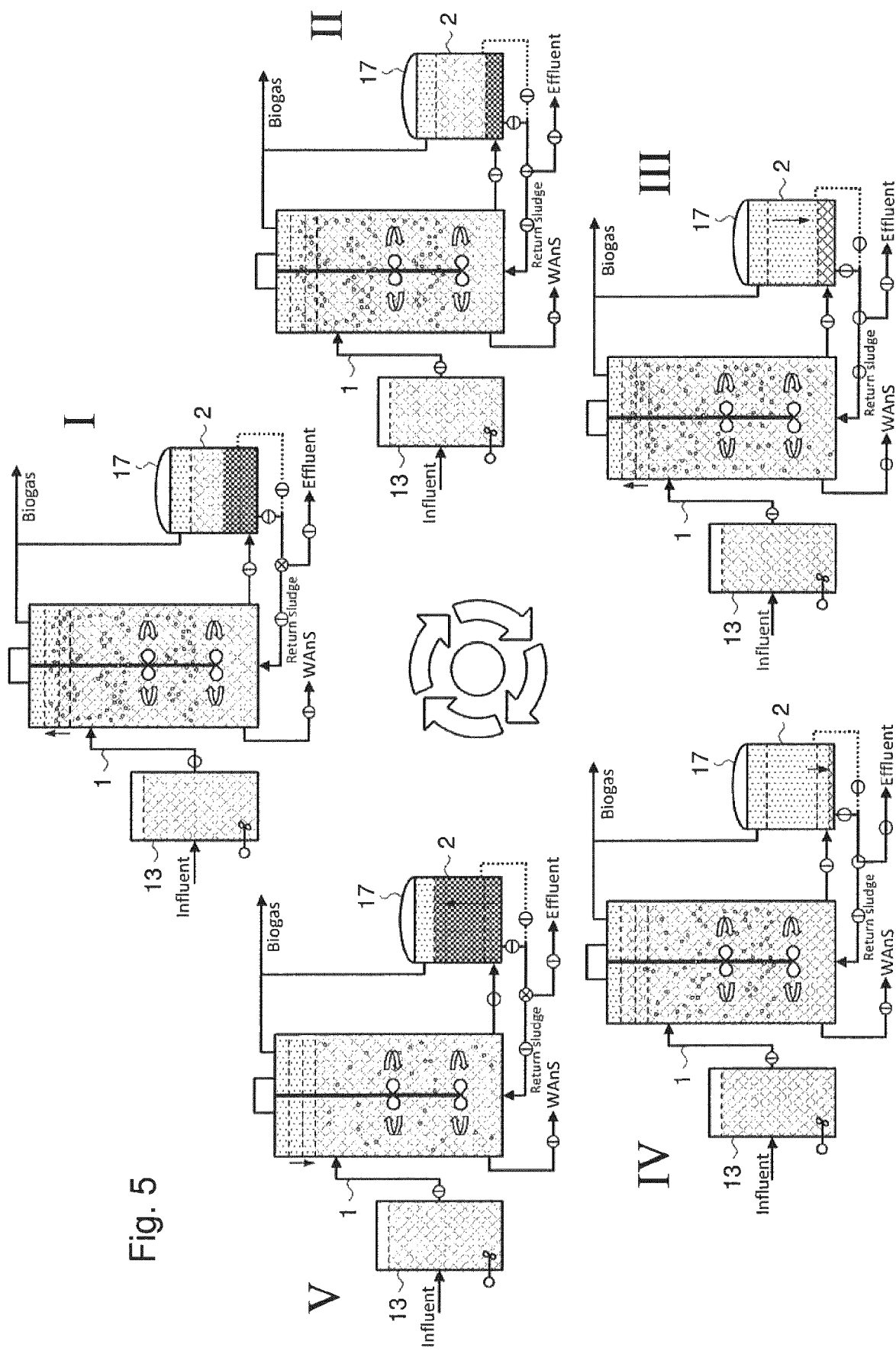
FIG. 5 schematically shows a general set-up of an installation (for use in a process) according to the invention.

A second preferred embodiment is illustrated by FIG. 3 and FIG. 5. This embodiment also offers various advantages such as mentioned above, including the possibility of a shorter overall cycle duration due to simultaneous actions like carrying out the settling in container (2) whilst the aqueous fluid in the bioreactor (1) is treated with the micro-organisms to convert biodegradable substance into biogas, filling of the bioreactor whilst effluent is withdrawn from the system, as well as maintaining an at least substantially constant biogas flow out of the installation.

In (i) the bioreactor feeding stage (drawing I of FIG. 5), the aqueous fluid comprising the biodegradable organic substance is fed into the bioreactor (1) via said inlet (14) for aqueous fluid, preferably whilst agitating, and which inlet (14) is situated in an upper part of the bioreactor. Feeding from an upper part, in particular at or near the fluid surface level in the bioreactor is desired, to avoid short circuiting; if the influent and effluent ports in the bioreactor are too close to each other, the feed could go out of the reactor without having had substantial contact with biomass.

At least after an initial process cycle, biogas present in the bioreactor is displaced by the aqueous fluid fed into the bioreactor (1) and said gas forms at least part of the biogas exit flow (15) during the feeding stage Any aqueous suspension originating from the bioreactor (1) that has previously been introduced into the first section (2a) of separate container (2) is allowed to settle in the first section (2a), thereby forming an upper liquid phase that has a reduced solid particles content, and generally is at least substantially free of a solid phase, and a lower sludge phase which has an increased solid particles content. If desired, in this stage, the suspension is degassed and/or subjected to agitation in the separate container (2). Agitation of the suspension in the separate container prior to settling (also known as 'extended mixing' because the suspension is continued to be agitated after leaving the bioreactor) has a number of advantages. For example, it helps to improve conversion of slow degrading material (such as fats and solids), because the contact of biomass with these components is improved and the biomass is allowed to degrade these in absence of other easier biodegradable substances. A further advantage of the extended mixing prior to settling is the effect of degassing while mixing: the extended mixing promotes the biogas release from the biomass, in particular from flocculent biomass, thereby improving settling in the following settling phases.

After feeding the bioreactor (1), (ii) the batch-reactor stage starts. In this stage phases biodegradable organic substance is converted by the micro-organisms, preferably anaerobic micro-organisms, in the bioreactor (1) whilst agitating the suspension in the bioreactor (1). In this stage, there is generally no feed into the reactor. The batch reactor stages comprises at least two phases: (iia) a first batch-reactor phase (drawing II of FIG. 5), wherein settling inside the separate container is continued, followed by (iib) a second batch-reactor phase in which settled material is withdrawn from the first section (2a) and usually returned to the bioreactor (via lines 6 and 8), see drawing II of FIG. 5.

In (iia) the first batch-reactor phase the suspension originating from the bioreactor (1) that has previously been introduced into the first section (2a) of separate container (2),—which is typically after an initial process cycle—is continued to be allowed to settle in the first section (2a).

In (iib) the second batch-reactor phase at least part of the settled sludge that has formed in a bottom section of first section (2a) is withdrawn from the first section. It is generally returned to the bioreactor via a conduit between an outlet (6) of the first section (2a) and inlet (8) in a bottom section of the bioreactor (1).

This stage is also preferred for discharge of surplus sludge from the installation, generally directly from bioreactor.

If desired, in the batch-reaction stage, in particular at least during the second phase, part of the biogas formed in bioreactor (1) is stored in second section (2b) of the container (2).

A (iii) fluid (liquid) effluent discharge stage, follows the second batch-reactor phase, see drawing IV of FIG. 5.

In the effluent discharge stage, after essentially all sludge (present in a lower part of the first section) has been removed from the first section (2a), the remaining aqueous fluid (preferably liquid) phase is withdrawn from the first section via outlet (6) and the effluent leaves the installation via discharge (7).

If desired, the second batch-reactor phase (iib) and fluid effluent discharge stage (iii) may also be reversed. For example, this order may be useful when selecting the type of sludge used in the process. If there is still sludge present in the effluent after discharge, it may be a sign of poor settling behavior of the sludge. In this particular embodiment, the effluent is withdrawn from the separate container (2) and thereafter at least part of the settled sludge that has formed in a bottom section of first section (2a) is withdrawn from the first section (2a). The sludge is generally returned to the bioreactor (1) via a conduit between an outlet (6) of the first section (2a) and inlet (8) in a bottom section of the bioreactor (1), see also Example 1.

In the effluent discharge stage, inside the bioreactor (1) there may still be some biodegradable substance present that is converted by the micro-organisms. However, the reaction rate will be substantially lower than the overall reaction rate during the reaction stage.

If desired, in this stage, the suspension is degassed in the bioreactor (1), whilst agitating the suspension. Part of the gas phase formed during degassing is usually stored in second section (2b) of the container (2). In practice, at the effluent discharge stage, the content of biodegradable substance in the reactor is very low at this stage, whereby the biogas production rate is very low. This is also advantageous for the settling in the separate container, as formation of biogas bubbles during settling may disturb settling rate.

After the effluent discharge stage, the (iv) bioreactor discharge stage takes place. This is illustrated by drawing V of FIG. 5. At least a part of the suspension is withdrawn from the bioreactor (1) from a bottom section of the bioreactor (1) via an outlet (16) and fed into first section (2a) of the container (2) via inlet (3) connected to outlet (16) via a conduit. Generally only a part of the suspension in the bioreactor (1) is withdrawn from it, such that sufficient micro-organisms remain in the bioreactor, to produce biogas in a subsequent process cycle.

Reaction conditions in the bioreactor can be based on known process, such as known anaerobic processes, for microbiologically treating an aqueous fluid comprising a biodegradable organic substance, e.g. as described in handbooks or the literature cited herein.

Usually, at least during the batch-reaction the suspension in the bioreactor comprises a flocculent mass, in particular a flocculent biomass, comprising the micro-organisms. As already mentioned above, a flocculent system has advantages over granular systems. The present invention also offers advantages over known systems wherein flocculent biomass is used. E.g. a process of the invention is advantageous over anaerobic-contact reactors in that it can be carried out in a more compact installation, as anaerobic-contact reactors require a large settler area, operation is easier to control (biomass retention in anaerobic-contact reactors is more easily upset), more operation flexibility, avoidance of the risk of greenhouse gas emission from the installation, avoidance or reduction of the risk of floating sludge due to insufficiently degassed sludge.

In an advantageous embodiment, the biogas flow out of the bioreactor (1) is monitored at least during (ii) batch reaction stage and used to determine when to proceed to the next stage.

Preferably, the biogas production rate is monitored at least during a substantial part of the process, more preferably throughout the process. This is e.g. done by measuring the biogas flow out of the bioreactor (in line 4, before the split to the container (2) and the biogas exit flow (15)). FIG. 6 shows two examples of a biogas production profile during a cycle of a process according to the invention. During the reaction stage, the content of organic substance will decrease, and the biogas production will consequently decrease as well. Then, two possible scenarios are (1) If the biogas production rate remains above a pre-set threshold at a specific time within the reaction stage (which can be determined by the skilled person for a specific system) then the next stage can be postponed to avoid overloading of the system as well as to promote proper degassing of sludge prior to settling (biogas production works as an uprising force hindering settling of sludge); (2) If the biogas production rate during the reaction phase is below a pre-set threshold at a specific time within the reaction stage (which can be determined by the skilled person for a specific system) then the system can thus receive more feed for the same time available or can go through that feed in less time, and thereby has extra capacity. Thus, the cycle time in the processes illustrated by the upper (black) refers to scenario (1) and illustrated by the lower (grey) lines refers to scenario (2).

Monitoring the biogas production rate is also useful to monitor whether the biogas production is (close to becoming) too high. Thus, one can regulate using the logic sequence: If biogas production towards the end of the reaction stage is higher than a threshold value, the reaction stage is delayed.

By monitoring the gas production rate out of the bioreactor (1) and comparing it with a target biogas exit rate (15) one can also direct any excess production above the target to the separate container (2b) for storage, and withdraw biogas when the biogas production from the bioreactor becomes lower than the target biogas exit flow rate or range. Monitoring can be done, e.g., by measuring the biogas pressure (e.g. in the headspace of the bioreactor or at or near the biogas outlet out of the bioreactor) or the biogas flow rate.

The target exit rate usually is a maximally allowable biogas exit flow rate. The skilled person will be able to determine this for a specific situation.

The target range is an acceptable variation (band width) around a desired average rate of biogas exiting the installation.

Thus, real-time system monitoring can be used to regulate and buffer variable exit biogas flow which a typical practical consequence of sequential batch operation as known in the art.

Thus, in an advantageous embodiment, an installation according to the invention comprises a biogas controlling system adapted to regulate an exit flow (15) of biogas from the installation, when the installation is used to microbiologically treat an aqueous fluid comprising biodegradable organic substance. Such system typically comprises a sensor to monitoring a parameter indicative of the biogas production rate. Such sensor can be a gas pressure sensor (in the headspace of the bioreactor 1 or in conduit 4) or a flow rate sensor (in conduit 4) or a sensor to determine the amount of biogas leaving the bioreactor. The system usually also comprises a sensor indicative of the flow rate or amount of biogas exiting the installation (biogas exit flow 15). The system usually further comprises a computing device and equipment to regulate biogas flow to and from the separate container 2, on the basis of input into to computing device from said sensors. In addition, section 2b of the separate container 2 may comprise a sensor for measuring a parameter indicative of amount of biogas or biogas pressure stored in the container 2.

The effluent from the container (2) can be discarded or used or further treated, in particular further purified, before being discarded or further used. Further treatments, such as further purification, can be done in a manner known per se. E.g. the effluent from the container can be subjected to filtration, reverse osmosis etc.

EXAMPLE 1

Dairy wastewater with a high suspended solids (2-5 g TSS/L) content and a high FOG (>600 mg/L) content was treated in a Simultaneous Phase Operated Anaerobic Sequential Batch Reactor according to the invention (see e.g. FIG. 3) in a process similar to FIG. 5, wherein the stages III and IV are carried out in a reversed order. The reactor was operated for 235 days in total. First, influent was fed into the reactor and the external container was degassed, during which phase a reaction, i.e. the conversion of pollutants from the wastewater into biogas, already took place in both reactor and external container. Next, the sludge was allowed to settle into the external container and was subsequently decanted and effluent was withdrawn from the external container afterwards. Meanwhile, the reaction was continued in the reactor. Finally, sludge was removed from the external container and fed into the bioreactor and then returned from the bioreactor into the external container.

Figure 7:
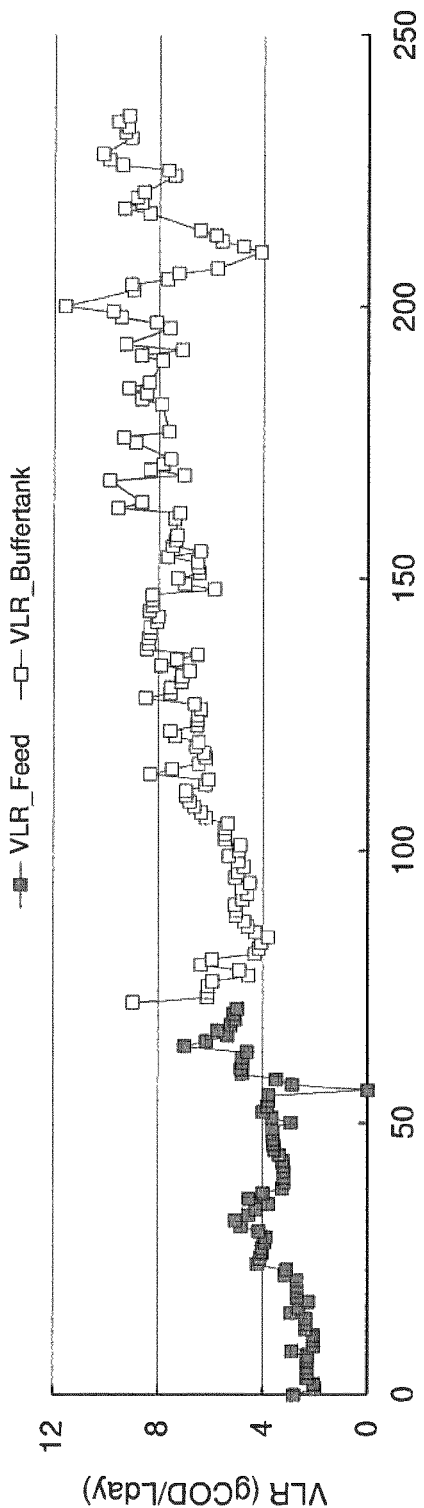
FIG. 7 shows a plot of volumetric loading rate (VLR) over time.
Figure 8:
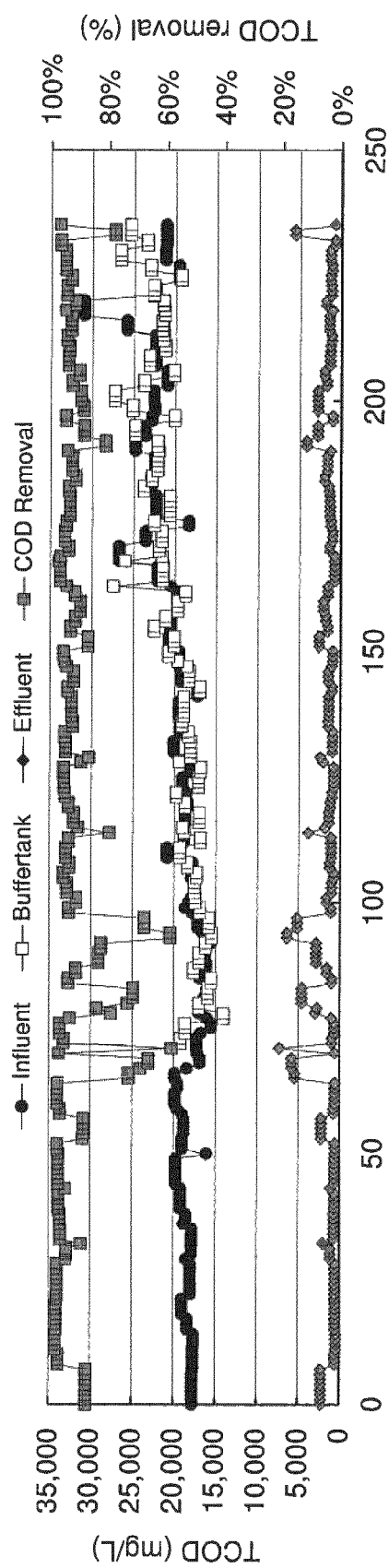
FIG. 8 shows a plot of Total Chemical Oxygen Demand (TCOD) concentrations and removal over time.
Figure 9:
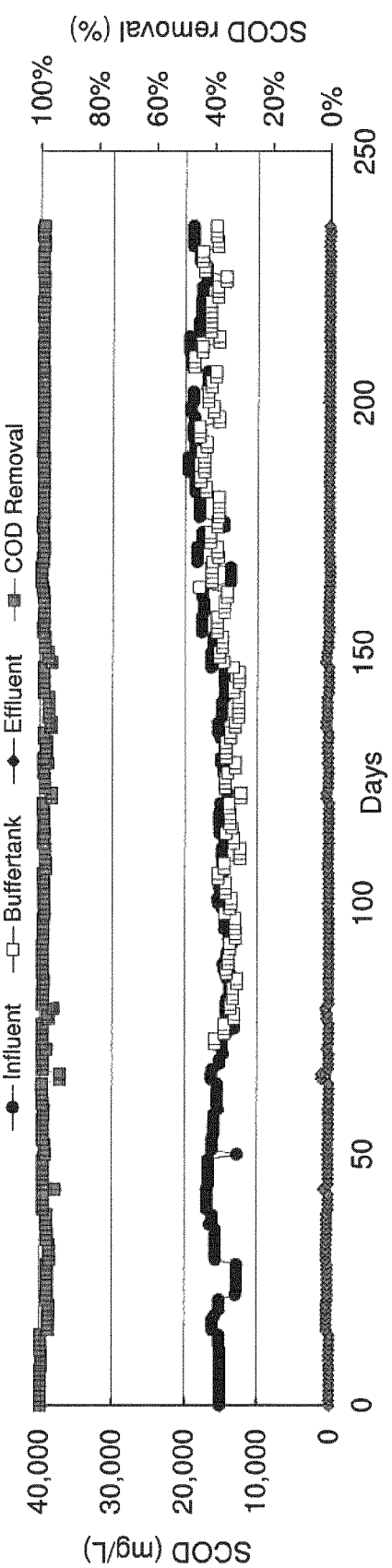
FIG. 9 shows a plot of Soluble Chemical Oxygen Demand (SCOD) concentrations and removal over time.
Figure 10:
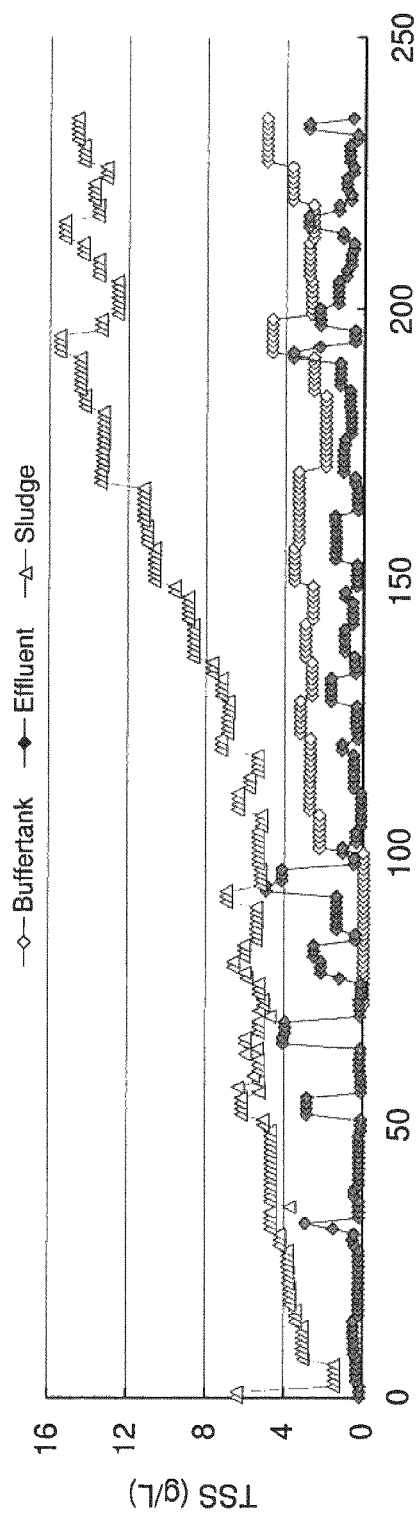
FIG. 10 shows a plot of Total Suspended Solids (TSS) concentrations over time.
Figure 11:
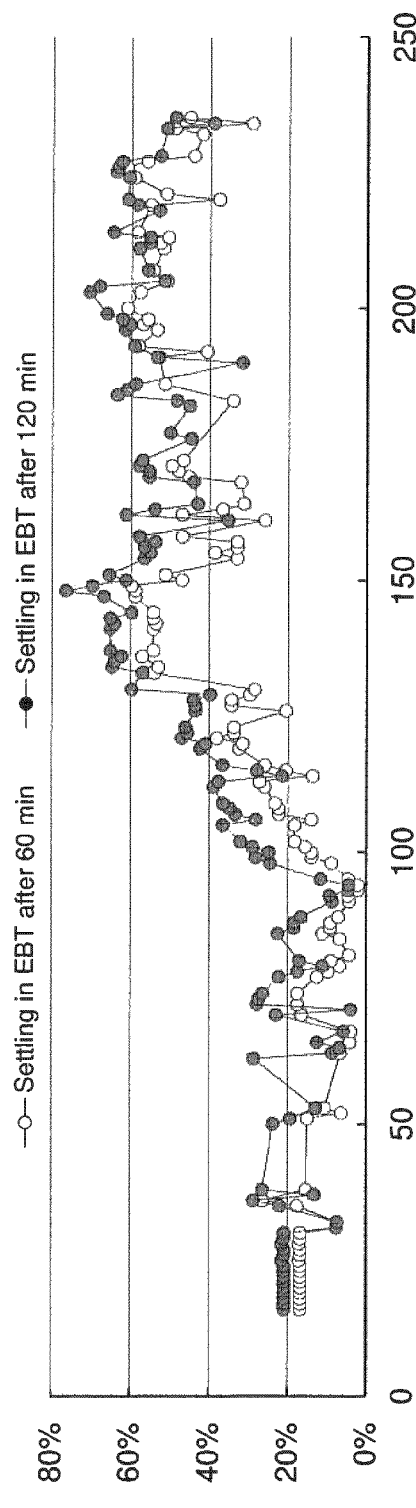
FIG. 11 shows a plot of sludge settleability over time.

High volumetric loading rate (VLR) of 8-10 g COD/L·day for over 100 days was achieved (FIG. 7). The total COD (TCOD) removal and soluble COD (SCOD) removal were monitored over time (FIG. 8 and FIG. 9). High TCOD removal of between 90-95% and excellent >98% SCOD removal during the operation time was achieved. In addition, the effluent had TSS concentrations consistently below 0.2-0.5 g/L; considered satisfactory for this type of flocculent anaerobic sludge systems with settling based separation (FIG. 10). Furthermore, sludge settleability was between 50-70% of the external container volume during the settling phase (FIG. 11). During operation time, no biomass loss as a result of accumulation of FOG in the form of floating sludge layers during settling and or fat balls in the reactor was observed.

The invention claimed is:

1. A process for treating an aqueous fluid, whereby a biogas is produced in an installation comprising a bioreactor (1), and a separate container (2), wherein the process comprises (i) a bioreactor feeding stage, thereafter (ii) a batch reaction stage, wherein biogas is formed and formed biogas is temporarily stored in the separate container (2), and thereafter at least one further stage (iii) comprising a settling stage and/or an aqueous fluid effluent discharge stage, wherein the biogas stored in the separate container (2) is used to reduce fluctuations in a biogas exit flow (15) from the installation, which further stage (iii) comprises settling of aqueous suspension and/or a discharge of fluid effluent.

2. The process of claim 1, wherein during at least a part of the (ii) batch reaction stage the separate container (2) is used as a settler wherein solid particles are allowed to settle from an aqueous suspension present in the container.

3. The process of claim 2, wherein during the batch reaction stage (ii) biogas is formed in the bioreactor (1) and simultaneously any aqueous suspension originating from the bioreactor (1) that has previously been introduced into a first section (2a) of separate container (2) is allowed to settle in said container (2).

4. The process of claim 3, wherein
in (i) the bioreactor feeding stage
the aqueous fluid comprising a biodegradable organic substance is fed into the bioreactor (1) via an inlet (14) for aqueous fluid, and which inlet (14) is situated in an upper part of the bioreactor,
gas present in the bioreactor is displaced by the aqueous fluid fed into the bioreactor (1) and said gas forms at least part of the biogas exit flow (15) during the feeding stage
any aqueous suspension originating from the bioreactor (1) that has previously been introduced into a first section (2a) of separate container (2) is allowed to settle in the first section (2a), thereby forming an upper fluid phase that has a reduced solid particle content compared to said suspension and a lower sludge phase that has an increased solid particle content compared to said suspension;
(ii) the batch-reaction stage comprises (iia) a first batch-reactor phase and (iib) a second batch-reactor phase in which phases biodegradable organic substance is converted by micro-organisms in the bioreactor (1) whilst agitating the suspension in the bioreactor (1)
wherein in (iia) the first batch-reactor phase any suspension originating from the bioreactor (1) that has previously been introduced into the first section (2a) of separate container (2) is continued to be allowed to settle in the first section (2a)
wherein in (iib) the second batch-reactor phase at least part of the settled sludge that has formed in a bottom sub-section of first section (2a) is returned to the bioreactor via a conduit between an outlet (6) of the first section (2a) and inlet (8) in a bottom section of the bioreactor (1) and wherein surplus sludge is discharged from the installation, directly from bioreactor
part of the biogas formed in bioreactor (1) is stored in second section (2b) of the container (2)
wherein in
(iii) a fluid effluent discharge stage, following or preceding the second batch-reactor phase,
the aqueous fluid phase is withdrawn from the first section (2a) via outlet (6) and discharge (7) after essentially all sludge has been removed from the first section (2a)
gas is removed from the suspension in the bioreactor (1), whilst agitating the suspension,
and
wherein after the second batch-reactor phase and fluid effluent discharge stage in (iv) a bioreactor discharge stage, at least a part of the degassed suspension is withdrawn from the bioreactor (1) from a bottom section of the bioreactor (1) via an outlet (16) and fed into first section (2a) of the container (2) via inlet (3) connected to outlet (16) via a conduit.

5. The process of claim 4, wherein the aqueous fluid comprising the biodegradable organic substance is fed into the bioreactor (1) via said inlet (14) for aqueous fluid, whilst agitating.

6. The process of claim 4, wherein the upper fluid phase is at least substantially free of a solid phase.

7. The process of claim 1, wherein stage (iii) comprises settling solids of an aqueous suspension, in particular sludge, taken from the bioreactor (1) in the separate container (2), thereby forming a phase comprising the settled solids and returning said phase to the bioreactor via a conduit between an outlet (6) of the separate container (2) and an inlet (8) in a bottom section of the bioreactor (1) and wherein surplus suspension, in particular sludge, is discharged from the installation, directly from the bioreactor.

8. The process of claim 1, wherein the bioreactor (1) contains an aqueous suspension, which suspension comprises an aqueous liquid phase and a solid phase, the suspension containing anaerobic micro-organisms, wherein the separate container (2) is for holding treated aqueous fluid (2a) from the bioreactor (1) and for holding biogas from (2b) the bioreactor (1),
the process comprising
(i) a bioreactor feeding stage, wherein the aqueous fluid comprising the biodegradable organic substance is fed into the bioreactor (1), and thereafter
(ii) a batch reaction stage, wherein biodegradable organic substance is converted by anaerobic micro-organisms in the bioreactor (1), thereby forming biogas, during which batch reaction phase a biogas exit flow out of the installation is maintained, wherein at least during a part of the batch reaction phase at least a part of the formed biogas is temporarily stored in the separate container (2), followed by
(iii) at least one further stage, which at least one further stage comprises a settling stage and/or an aqueous fluid effluent discharge stage
and wherein the biogas stored in the separate container (2) is used to reduce fluctuations in the biogas exit flow (15) during the batch reaction stage or thereafter.

9. The process of claim 1, wherein the bioreactor contains a flocculent biomass.

10. The process of claim 1, wherein the biogas is stored in an upper part of the separate container (2) and the separate container (2) has a flexible upper cover (17), which upper cover (17) comprises an inflatable double membrane, having a first and a second membrane wherein a upon inflation a space is created between said first and second membrane.

11. The process of claim 10, wherein the space between the first and the second membrane is inflated or deflated so as to maintain a pressure of the biogas (2b) inside the separate container (2) within a defined range.

12. The process of claim 10, wherein the space between the first and the second membrane is increased in order to cause biogas (2b) stored in the container (2) to the biogas exit (15) when the biogas exit flow is below a lower threshold value and/or wherein the space between the first and the second membrane is decreased to allow storage of more biogas when the biogas production rate is above an upper threshold value.

13. The process of claim 1, wherein the biogas exit flow or a production rate of biogas in the bioreactor (1) is monitored at least during (ii) batch reaction stage and used to determine when to proceed to a next stage.

14. The process of claim 1, wherein bioreactor (1) comprises an internal separator system (11) present in the bioreactor (1) which internal separator system (11) is positioned above an inlet (14) for aqueous fluid comprising a biodegradable organic substance and below an outlet (16) for treated aqueous fluid, out of the bioreactor, which separator system (11) is used to separate aqueous fluid of the suspension from the solid phase and the biogas and which separated aqueous fluid is collected in an upper part of the bioreactor (1), i.e. above the separator system (11), wherein
in (i) the bioreactor feeding stage
the aqueous fluid comprising the biodegradable organic substance is fed into the bioreactor (1) via said inlet (14) for aqueous fluid (without substantial agitation other than any agitation caused by the feeding),
the separated aqueous fluid is withdrawn from the bioreactor through outlet (16) and at least part thereof is fed into a first section (2a) of the separate container (2)
if needed, biogas present in a second section (2b) of the separate container (2b) is used to provide at least part of the biogas exit flow (15) during the feeding stage;
in (ii) the batch reaction stage
the aqueous suspension in the bioreactor (1) is agitated
if desired, aqueous suspension, is withdrawn from the bioreactor through outlet (16) positioned above the internal separator system (11) and recycled to the bioreactor via recycle (12b) of which the inlet is positioned below internal separator system (11)
aqueous fluid stored in the first section (2a) is withdrawn from the installation via the outlet (6) for aqueous fluid
and wherein (ii) the batch reaction stage is followed by (iii) a settling stage, during which stage conversion of biodegradable organic substance by the micro-organisms may continue,
the settling stage comprising settling of solids in the bioreactor whereby an aqueous fluid phase forms above the internal separator system
aqueous fluid stored in the first section (2a) is withdrawn from the installation via the outlet (6) for aqueous fluid
if present, surplus of suspension is discarded from the bioreactor via an outlet (9), in a lower part of the bioreactor
when needed, biogas from the second section (2b) is used to provide at least part of the biogas exit flow (15) during the settling stage.

15. The process of claim 14, wherein the process is operated under anaerobic conditions.

16. The process of claim 1, wherein said stages are repeated a plurality of cycles, and wherein at least after the first cycle an at least substantially constant biogas exit flow is maintained during said stages.

17. The process of claim 1, wherein the aqueous fluid to be treated has a total organic substance content in a range of 0.3-100 g COD/l and/or a total suspended solids content in the range of 1-30 g/l.

18. The process of claim 1, wherein from the first section (2a) of the separate container (2) an aqueous effluent is withdrawn that is at least substantially free of solid particles visible to a naked eye.

19. The process of claim 1, wherein downstream of the installation, effluent (7) from the first section (2a) of the container (2) is subjected to a purification step.

20. The process of claim 19, wherein the (i) bioreactor feeding stage, the (ii) batch reaction stage and the (iii) settling stage and/or the fluid effluent discharge stage are carried out simultaneously for at least a substantial part.

21. The process of claim 1, whereby the bioreactor operates under anaerobic conditions.

* * * * *